United States Patent
Ono et al.

(10) Patent No.: US 8,751,107 B2
(45) Date of Patent: Jun. 10, 2014

(54) VEHICLE, VEHICLE CONTROL DEVICE, AND VEHICLE MANUFACTURING METHOD

(75) Inventors: Eiichi Ono, Toyota (JP); Katsuhiko Fukui, Nagoya (JP); Yasuhiro Iga, Toyota (JP); Shigeru Iketani, Okazaki (JP); Tomoaki Shida, Toyota (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 627 days.

(21) Appl. No.: 12/357,015

(22) Filed: Jan. 21, 2009

(65) Prior Publication Data

US 2009/0192678 A1 Jul. 30, 2009

(30) Foreign Application Priority Data

Jan. 24, 2008 (JP) ................. 2008-013613

(51) Int. Cl.
*G06F 19/00* (2011.01)
(52) U.S. Cl.
USPC .................. 701/41; 701/45; 701/49
(58) Field of Classification Search
USPC ............................. 701/41, 45, 49
See application file for complete search history.

(56) References Cited

U.S. PATENT DOCUMENTS

| 2,187,027 | A | | 1/1940 | Harvey |
| 4,554,199 | A | * | 11/1985 | Roentgen et al. ............. 428/194 |
| 6,753,804 | B2 | | 6/2004 | Miyahara ........................ 342/70 |
| 7,159,924 | B2 | * | 1/2007 | Ito et al. ..................... 296/96.19 |

FOREIGN PATENT DOCUMENTS

| JP | U-53-19920 | 2/1978 |
| JP | B2-2553861 | 8/1996 |
| JP | A-2005-262956 | 9/2005 |

OTHER PUBLICATIONS

Jan. 26, 2010 Office Action issued in Japanese Patent Application No. 2008-013613 (with translation).
Office Action issued in corresponding Japanese Application No. 2008-013613, mailed Sep. 7, 2010. (with English-language translation).

* cited by examiner

*Primary Examiner* — Luna Champagne
(74) *Attorney, Agent, or Firm* — Oliff PLC (57) ABSTRACT

A shape of a boundary line between a forward view in a forward field of vision of a driver and a vehicle structural part that blocks a lower end of the forward view, i.e., the shape of a so-called visible edge of a vehicle hood, a shape of a visible edge of a vehicle instrument panel, or a shape of a top edge of a ceramic line formed at a windshield glass is made to be a curve. The curve may be expressed by hyperbolic function $y^2 = Ax^2 + 2Bx + C$, where x is a depression angle, y is an azimuth angle, A is a constant expressed by a sum of a ratio of a distance between a viewpoint height and a roll axis with respect to the viewpoint height and a reciprocal of a product of a roll rate and the viewpoint height, B is a constant expressed by a reciprocal of the roll rate, and C is a constant expressed by the constant A, the constant B and a depression angle of a sight-line direction of a driver.

7 Claims, 7 Drawing Sheets

FLOW LINES OF FORWARD FIELD OF VISION WHEN
TRAVELING WHILE SLALOMING (WITH ROLLING)

FIG. 3

FLOW LINES OF FORWARD FIELD OF VISION WHEN
TRAVELING WHILE SLALOMING (NO ROLLING)

FIG. 4

PERCEPTION THRESHOLD VALUE RATIOS (1: STRAIGHT)

FIG. 5

COMPARISON OF SENSORY EVALUATIONS OF ACTUAL VEHICLES

FIG. 6

ROLLING MOTION

FIG. 7

LATERAL MOTION

FIG. 8

YAW MOTION

VEHICLE, VEHICLE CONTROL DEVICE, AND VEHICLE MANUFACTURING METHOD

CROSS-REFERENCE TO RELATED APPLICATION

This application is based on and claims priority under 35 USC 119 from Japanese Patent Application No. 2008-013613 filed Jan. 24, 2008.

BACKGROUND

1. Technical Field

The present invention relates to a vehicle, a vehicle control device, and a vehicle manufacturing method, and in particular, to a vehicle, a vehicle control device, and a vehicle manufacturing method that can ameliorate a rolling sensation that is felt by visual information.

2. Related Art

When a vehicle travels while turning, rolling motion is generated by the working of centrifugal force, and the steering of the driver who feels the rolling sensation is affected by the rolling motion. In order to ameliorate the rolling sensation, it has been thought to increase the roll rigidity and decrease the rolling by making the spring constant of the suspension high, or the like. However, by increasing the roll rigidity, the comfort of the ride in a state of usual traveling deteriorates.

In order to overcome this problem, a vehicle is proposed that ameliorates the comfort of the ride as follows: in a state of traveling while turning, the twist amount of the stabilizer is promptly adjusted to a target twist amount that is determined in accordance with the lateral acceleration, and the rolling is decreased. In a state of straight traveling, by gradually changing the twist amount of the stabilizer to a neutral twist amount at which substantially equal restoring forces can be supplied to the left and right wheels, shock-like vibrations in the rolling direction that are caused by control for maintaining the neutral state are suppressed (Japanese Patent No. 2553861).

Further, a device has been proposed that makes the apparent roll angle seem small by, when rolling occurs, displaying the shape of a visible edge, that is displayed on a liquid crystal panel at the front windshield, at an incline in the direction opposite to the direction of occurrence of the rolling (Japanese Patent Application Laid-Open (JP-A) No. 2005-262956).

However, in a case of adjusting the twist amount of the stabilizer as described above, a mechanism for actively controlling the twist amount of the stabilizer is needed. Further, in a case of displaying the visible edge at an incline in the direction opposite to the direction of the occurrence of rolling, the rolling direction and the roll angle must be computed, and therefore, there is the problem that control is complex.

SUMMARY

The present invention has been made in view of the above circumstances, and provides a vehicle, a vehicle control device, and a vehicle manufacturing method. The present invention provides a vehicle wherein a shape of a boundary line between a forward view in a forward field of vision of a driver and a vehicle structural part that blocks a lower end of the forward view, is formed so as to be an upwardly-convex curve whose curvature gradually decreases in a vehicle transverse direction from a vehicle transverse direction center.

The present invention provides a vehicle wherein a shape of a boundary line between a forward view in a forward field of vision of a driver and a vehicle structural part that blocks a lower end of the forward view, is formed so as to be parallel or substantially parallel to a curve that has been generated based on continuing flow lines irrespective of longitudinal speed of the vehicle at a time when the vehicle travels at a predetermined vehicle speed while minute steering is carried out.

The curve, that has been generated based on continuing flow lines irrespective of longitudinal speed at a time of the vehicle when the vehicle travels at a predetermined vehicle speed while minute steering is carried out, is an upwardly-convex curve whose curvature gradually decreases in a vehicle transverse direction from a vehicle transverse direction center. This curve is expressed by the azimuth angle and the depression angle. In accordance with the vehicle of the present invention, the shape of a boundary line between a forward view in a forward field of vision of a driver and a vehicle structural part that blocks a lower end of the forward view, i.e., the shape of a so-called visible edge, is formed so as to be an upwardly-convex curve whose curvature gradually decreases in a vehicle transverse direction from a vehicle transverse direction center. Therefore, the shape of the boundary line between the forward view in the forward field of vision of the driver and the vehicle structural part that blocks the lower end of the forward view, is parallel or substantially parallel to a curve that has been generated based on continuing the flow lines. The rolling motion, that is perceived as visual information, becomes difficult to perceive, and the rolling sensation at times when the vehicle travels while turning or the like can be ameliorated.

The curve can be expressed by a hyperbolic function. Further, the origin of the curve can be positioned at a vehicle transverse direction center of the boundary line, or at a portion of the boundary line that is in front of a driver's seat. In this way, by positioning the origin of the curve at the center in the vehicle transverse direction, the rolling sensation of passengers other than the driver also can be ameliorated. Further, by positioning the origin of the curve in front of the driver's seat, the origin of the curve can be positioned on the vertical line that passes through the center of the field of vision of the driver, and therefore, the rolling sensation of the driver can be further ameliorated.

The shape of the boundary line of the vehicle of the present invention can be made to be a shape of a visible edge of a vehicle hood, a shape of a visible edge of a vehicle instrument panel, a shape of a top edge of a ceramic line formed at a windshield glass, a shape of a top edge of a blade portion of a windshield wiper, or a shape of a top edge of an arm portion of the windshield wiper.

The curve can be expressed by the following function:

$$y^2 = Ax^2 + 2Bx + C$$

where x is a depression angle, y is an azimuth angle, A is a constant expressed by a sum of a ratio of a distance between a viewpoint height and a roll axis with respect to the viewpoint height and a reciprocal of a product of a roll rate and the viewpoint height B is a constant expressed by a reciprocal of the roll rate, and C is a constant expressed by the constant A, the constant B and a depression angle of a sight-line direction of a driver.

The shape of the boundary line may be a fixed shape regardless of the traveling state of the vehicle. Further, the shape of the boundary line may be changed such that the proportion, that is convex, of the curve increases as the vehicle speed increases, so as to obtain an optimal boundary line shape in accordance with the vehicle speed.

The present invention provides a vehicle control device having: a blocking member displayed so as to block a lower end portion of a view within a forward field of vision of a driver along a lower end portion of a windshield glass, a shape of a top edge of the blocking member being changeable; a vehicle speed detecting section detecting vehicle speed; and a shape modification section modifying the shape of the top edge of the blocking member such that the shape of the top edge of the blocking member becomes parallel or substantially parallel to a curve that is generated based on continuing flow lines irrespective of longitudinal speed of the vehicle at a time when the vehicle travels at a vehicle speed detected by the vehicle speed detecting section, while minute steering is carried out.

In the vehicle control device of the present invention, when the shape of the boundary line is expressed by the above function, the coefficient B in the above function is determined so as to decrease as the vehicle speed increases.

The present invention provides a method of manufacturing a vehicle, including: determining an upwardly-convex curve whose curvature gradually decreases in a vehicle transverse direction from a vehicle transverse direction center; and manufacturing a vehicle such that a shape of a boundary line between a forward view in a forward field of vision of a driver and a vehicle structural part that blocks a lower end of the forward view, is a shape expressed by the curve.

The present invention provides a method of manufacturing a vehicle, including: determining a curve that is generated based on continuing flow lines irrespective of longitudinal speed at a time of a vehicle when the vehicle travels at a predetermined vehicle speed while minute steering is carried out; and manufacturing a vehicle such that a shape of a boundary line between a forward view in a forward field of vision of a driver and a vehicle structural part that blocks a lower end of the forward view, is parallel or substantially parallel to the curve.

As described above, in accordance with the present invention, there is the effect that the rolling sensation at the time of traveling while turning and the like can be ameliorated by a simple structure.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail hereinafter with reference to the drawings.

First Exemplary Embodiment

Figure 1:
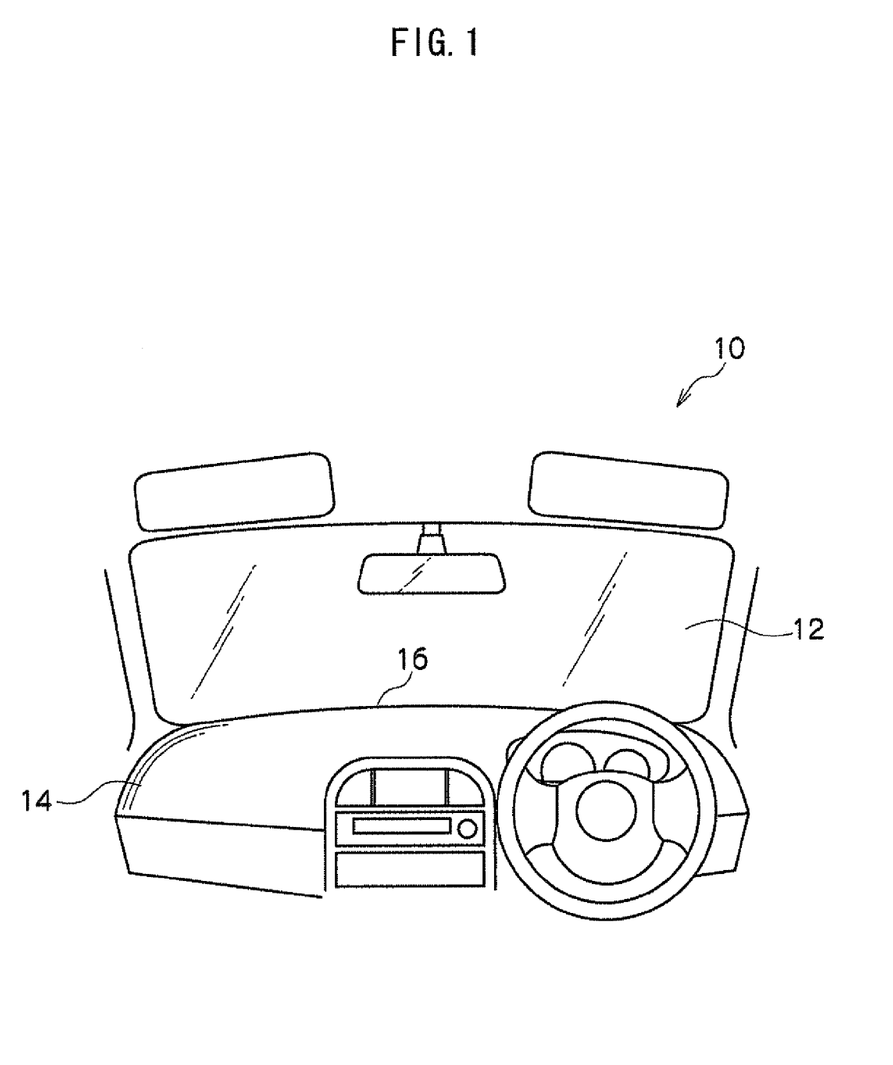
FIG. 1 is a schematic drawing showing a portion of a vehicle interior of a first exemplary embodiment.

FIG. 1 is a schematic drawing showing a portion of an interior of a vehicle 10 of the present exemplary embodiment, which portion is forward of the driver's seat. The vehicle 10 has a windshield glass 12 and an instrument panel 14. The lower end of the forward view within the forward field of vision of the driver, who can see through the windshield glass 12, is obstructed by the instrument panel 14 that blocks the lower end portion of the windshield glass 12. A visible edge 16, that is the boundary between the forward view and the vehicle structural part that blocks the lower end of the front view, is formed by the top edge of the instrument panel 14. The shape of the visible edge 16 is expressed by a hyperbola that will be described later.

Here, the method of computing the hyperbola that is the shape of the visible edge 16 will be described.

Figure 2:
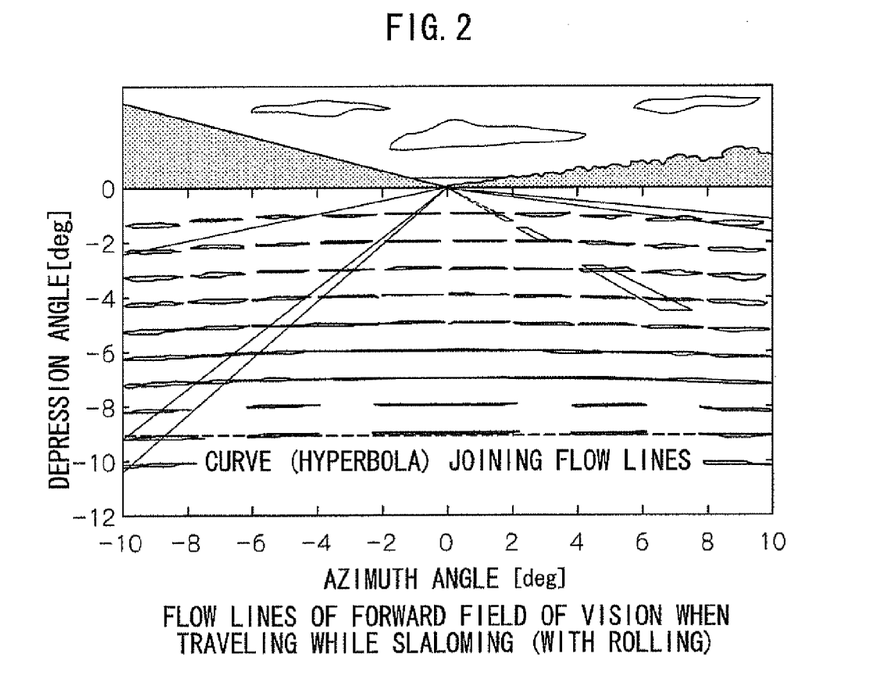
FIG. 2 is a drawing showing flow lines at the time of minute steering slaloming at a vehicle speed of 100 km/h.

FIG. 2 is a drawing showing the flow lines at the time of traveling, while minute steering slaloming, at a vehicle speed of 100 km/h that is a vehicle speed at which the rolling sensation is important. The cycle of the minute steering is the ordinarily used range (usually 0.5 Hz). The relative movement of the road in a case of irrespective of longitudinal speed in the forward field of vision is expressed as flow lines. A curve that is generated by making these flow lines be continuous is, due to the effects of the rolling motion, a curve that is convex upwardly and whose origin is the vanishing point in forward infinity.

Figure 3:
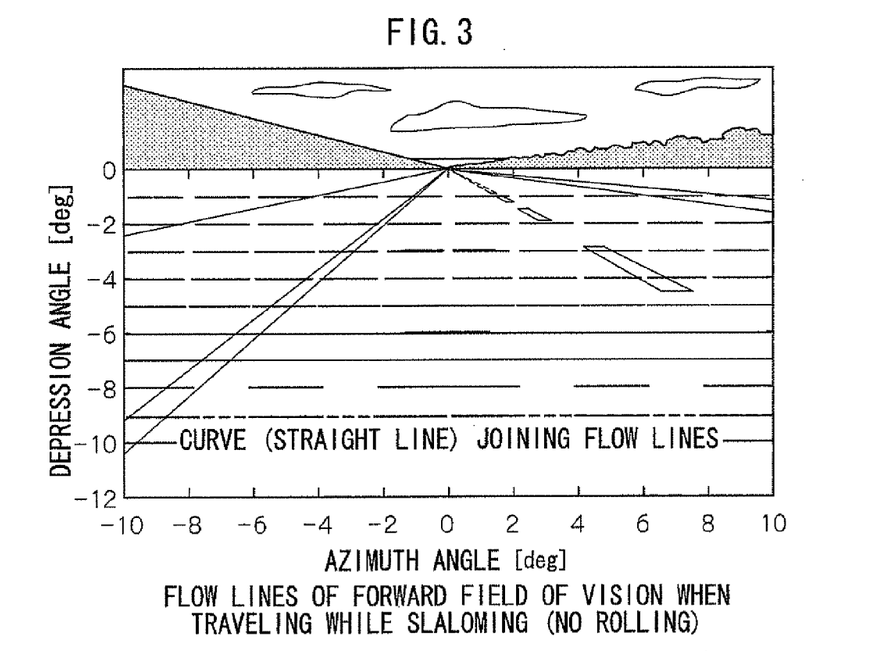
FIG. 3 is a drawing showing flow lines at the time of minute steering slaloming at a vehicle speed of 100 km/h, in a vehicle in which a roll angle does not arise.

FIG. 3 is a drawing showing the flow lines at the time of traveling such that a roll angle does not arise at a vehicle speed of 100 km/h. In the same way as in FIG. 2, the relative movement of the road in a case of irrespective of longitudinal speed in the forward field of vision is expressed as flow lines. A curve generated by making these flow lines be continuous is a straight line that is parallel to a horizontal plane.

Therefore, by designing the shape of the visible edge 16 along a curve that has been generated based on continuing the flow lines, the relative movement between the visible edge 16 and the road surface that is traveled becomes close to movement at the time when rolling does not arise. Accordingly, because the sensitivity to rolling motion that the driver perceives from visual information decreases, the rolling sensation can be ameliorated.

Further, the amelioration in the rolling sensation is demonstrated by test results. The shape of the visible edge 16 was made to be a straight shape that was parallel to a horizontal plane, and longitudinal motion traveling at a vehicle speed of 100 km/h was simulated and displayed on a screen in front of a test subject, and simultaneously, by using an exciter that could simulate arbitrary motion of six degrees of freedom, lateral motion, rolling motion, pitch motion and yaw motion were imparted to the test subject, and, for each motion, the amplitude (called "perception threshold value") at the point in time when the test subject perceived the motion was measured.

The measurement of the perception threshold value of the rolling motion was carried out by, in a state in which lateral motion, pitch motion and yaw motion, that are other than rolling motion, were applied, gradually increasing the roll amplitude, and measuring the amplitude at the point in time when the test subject perceived the rolling motion.

The perception threshold values of the respective motions were measured under similar conditions also for a case in which the shape of the visible edge 16 was made to be an upwardly-convex curve that approximated the shape along the flow lines in FIG. 2.

Figure 4:
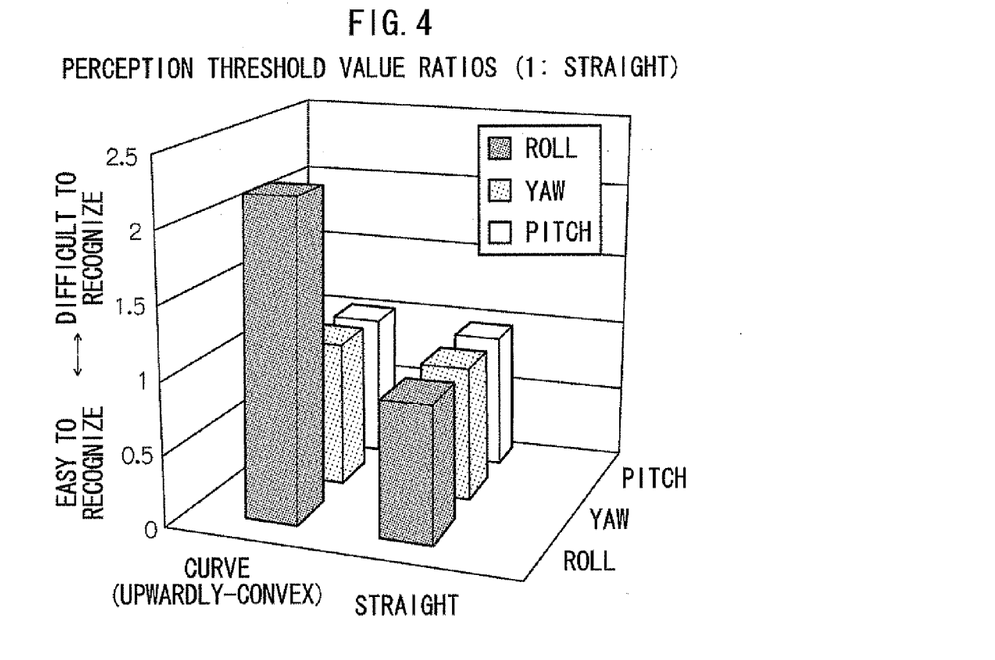
FIG. 4 is a graph showing motion perception threshold values.

FIG. 4 is a graph showing the perception threshold values of the respective motions. The perception threshold values in the case in which the shape of the visible edge 16 was made to be an upwardly-convex curve are illustrated, with the perception threshold values in the case in which the shape of the visible edge 16 was made to be straight being 1. With regard to pitch motion and yaw motion, there are no effects due to the shape of the visible edge 16. In contrast, with regard to rolling motion, the perception threshold value becomes about twice as large by making the shape of the visible edge 16 be an upwardly-convex curve. It can be understood that the sensitivity with respect to rolling motion decreases.

Figure 5:
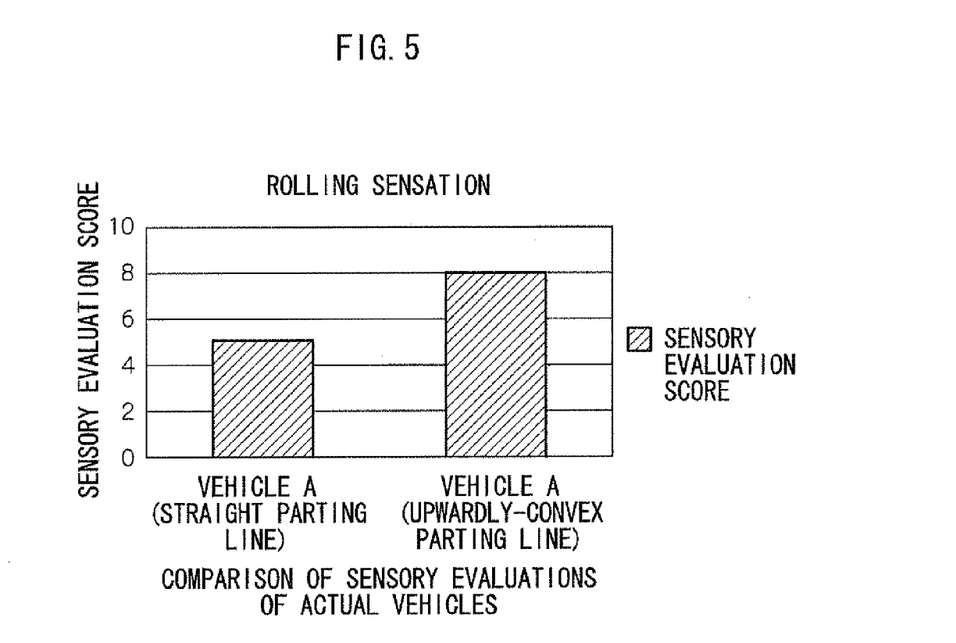
FIG. 5 is a graph showing results of investigation of sensory evaluation of the rolling sensation with respect to the shape of the visible edge.

Moreover, FIG. 5 illustrates the results of investigation of sensory evaluation of the rolling sensation with respect to the shape of the visible edge 16. The rolling sensation at the time of carrying out traveling while slaloming, traveling while changing lanes and traveling while turning, from low/intermediate speed to high speed in an actual vehicle, was evaluated on a scale from 0 points (poor) to 10 points (good). In a case in which the shape of the visible edge 16 was straight, a score of 5 points was received, whereas, in a case in which the shape of the visible edge 16 was an upwardly-convex curve, a score of 8 points was received, thereby confirming that the rolling sensation is ameliorated by making the shape of the visible edge 16 be an upwardly-convex curve.

By making the visible edge 16 be a shape along the forward flow lines in this way, it becomes difficult for the driver to perceive rolling motion, that the driver perceives as visual information from the relative movement between the visible edge 16 and the road. As a result, it feels as if there is less rolling. Therefore, effects that are sensorially equivalent to those in a case in which the rolling is kept small by suspension control or the like are obtained, and the rolling sensation can be ameliorated without using active control.

Here, the shape of the visible edge 16 is determined, regardless of the magnitude of the roll angle, from the balance between, on the one hand, the roll angle, and, on the other hand, lateral movement and the yaw angle, and an optimal value that corresponds to the specifications of the vehicle exists.

Thus, a detailed formula of the hyperbola that expresses the shape of the desired visible edge 16 is derived. In order to derive a hyperbola that is generated based on continuing flow lines, the flow lines of the forward field of vision at the time of traveling while carrying out minute steering are derived, and relational expressions of this minute motion are written as differential equations. Moreover, a detailed formula of the hyperbola is derived by solving these.

Figure 6:
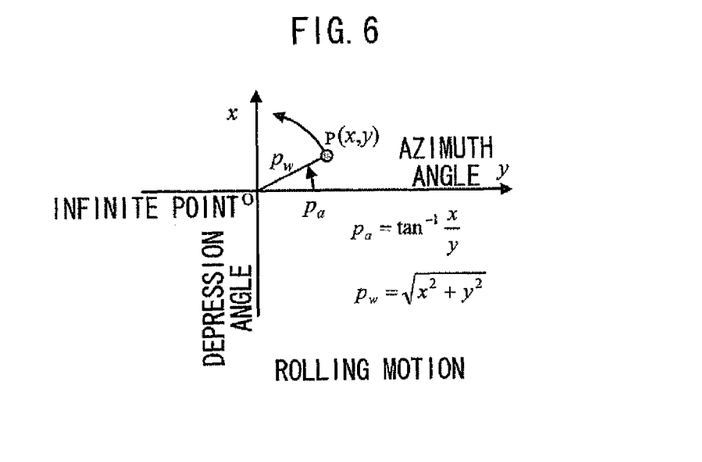
FIG. 6 is a schematic drawing for explaining rolling motion.

First, as shown in FIG. 6, the rolling motion whose reference is the viewpoint of the driver becomes circular motion around origin O in an xy coordinate system in which the infinite point in the advancing direction at the time of straight traveling is the origin O, and the depression angle is x [rad] (the elevation angle that is upward of the horizon is expressed as positive, and the depression angle that is downward of the horizon is expressed as negative) and the azimuth angle is y [rad]. Given that the position of an arbitrary point P is (x, y), and that the angle formed by the y axis and a straight line OP that connects the origin O and the point P is $p_a$, when the roll angle φ changes by minute amount dφ, the position of point P changes to (x+dx, y+dy), where dx and dy are as follows.

[Formula 1]

$$dx = p_w \cos p_a \cdot d\phi \qquad (1)$$
$$= y \cdot d\phi$$

$$dy = -p_w \sin p_a \cdot d\phi \qquad (2)$$
$$= -x \cdot d\phi$$

$$(p_w = \sqrt{x^2 + y^2})$$

Figure 7:
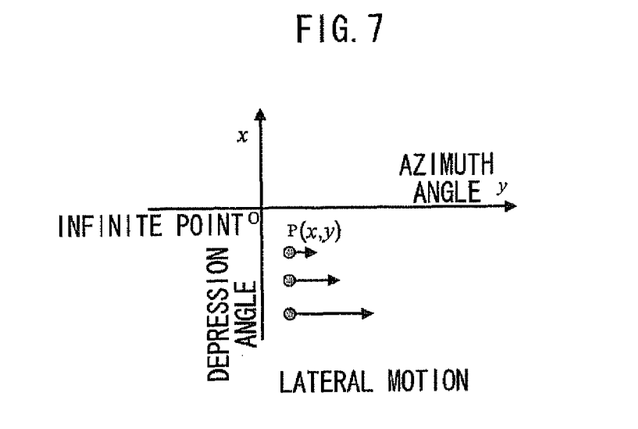
FIG. 7 is a schematic drawing for explaining lateral motion.

Next, as shown in FIG. 7, the lateral motion whose reference is the viewpoint of the driver becomes motion that is parallel to the y axis. The position of point P; when a minute lateral position change dY arises, changes from a position (x, y) of the arbitrary point P on the road surface to (x+dx, y+dy), where dx and dy are as follows.

[Formula 2]

$$dx = 0 \qquad (3)$$

$$dy = -\frac{x}{h_{eye}} \cdot dY \qquad (4)$$

Here, $h_{eye}$ is the height of the viewpoint (eye level) whose reference is the road surface. Note that, for lateral motion, x<0 because only the position on the road surface is taken into consideration.

From a roll rate $K_{roll}$, a steering frequency f and lateral movement of the viewpoint at the time when rolling arises, the relationship between the lateral position change dY and the roll angle change dφ is expressed as:

[Formula 3]

$$dY = -\frac{d\phi}{(2\pi f)^2 K_{roll}} - h_{roll} d\phi \qquad (5)$$

Here, $h_{roll}$ expresses the distance between the viewpoint height and the roll axis. By substituting formula (5) into formula (4), the following formula is obtained.

[Formula 4]

$$dy = \frac{x}{h_{eye}} \cdot \left( \frac{1}{(2\pi f)^2 K_{roll}} + h_{roll} \right) d\phi. \qquad (6)$$

Figure 8:
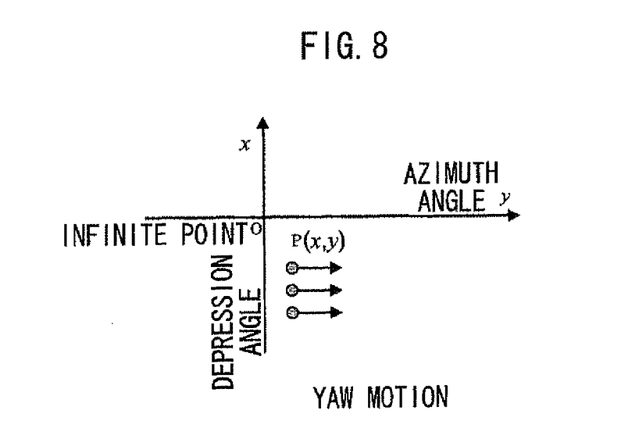
FIG. 8 is a schematic drawing for explaining yaw motion.

Next, as shown in FIG. 8, the yaw motion whose reference is the viewpoint of the driver becomes motion that is parallel to the y axis. The position of point P when a minute yaw angle change dψ arises changes from a position (x, y) of the arbitrary point P on the road surface to (x+dx, y+dy), where dx and dy are as follows.

[Formula 5]

$$dx = 0 \qquad (7)$$

$$dy = d\psi \qquad (8)$$

The relationship between the yaw angle change dψ and the roll angle change dφ is expressed as follows, when the difference between the phases of the both is ignored.

[Formula 6]

$$d\psi = \frac{d\phi}{2\pi f u K_{roll}} \quad (9)$$

Here, u is the vehicle speed. By substituting formula (9) into formula (8), the following formula is obtained.

[Formula 7]

$$dy = -\frac{d\phi}{2\pi f u K_{roll}}. \quad (10)$$

When combining the above motions, the change in the position (x, y) of the arbitrary point P is as follows, from formulas (1) through (3), formulas (6) through (8), and formula (10).

[Formula 8]

$$dx = y \cdot d\phi \quad (11)$$

$$dy = \left(\frac{1}{(2\pi f)^2 K_{roll} h_{eye}} + \frac{h_{roll}}{h_{eye}} - 1\right) x \cdot d\phi - \frac{1}{2\pi f K_{roll}} d\phi \quad (12)$$

When these differential equations are arranged, they become

[Formula 9]

$$y \cdot dy = \left(\frac{1}{(2\pi f)^2 K_{roll} h_{eye}} + \frac{h_{roll}}{h_{eye}} - 1\right) x \cdot dx - \frac{1}{2\pi f K_{roll}} dx, \quad (13)$$

and by solving formula (13), the following formula is obtained.

[Formula 10]

$$y^2 = \left(\frac{1}{(2\pi f)^2 K_{roll} h_{eye}} + \frac{h_{roll}}{h_{eye}} - 1\right) x^2 - \frac{1}{\pi f K_{roll}} x + C \quad (14)$$

Further, when an integration constant C, that is such that the hyperbola expressed by formula (14) becomes azimuth angle y=0 and depression angle x=θ, is introduced, the following relationships are derived.

[Formula 11]

$$y^2 = Ax^2 + 2Bx + C \quad (15)$$

$$A = \frac{h_{roll}}{h_{eye}} + \frac{1}{(2\pi f)^2 K_{roll} h_{eye}} - 1 \quad (16)$$

$$B = -\frac{1}{2\pi f K_{roll} u} \quad (17)$$

$$C = -A\theta^2 - 2B\theta \quad (18)$$

From these relational expressions, it can be understood that the coefficient A (formula (16)) of the second order of the depression angle increases monotonically in accordance with the distance between the roll axis and the viewpoint height, and decreases monotonically in accordance with the viewpoint height, and decreases monotonically in accordance with the roll rate. It can be understood that the coefficient B (formula (17)) of the first order of the depression angle decreases monotonically in accordance with the roll rate.

The coefficient B of the first order of the depression angle includes the vehicle speed u, and decreases monotonically in accordance with the vehicle speed u. The hyperbola of above formula (15) can be determined unambiguously by using a speed at which the rolling sensation is important (e.g., 100 km/h can be used, but the speed can be determined in advance in accordance with the type of the vehicle) as the vehicle speed u, a frequency of an ordinarily used range of minute steering (usually 0.5 Hz) as the steering frequency f, standard values as the sight-line height $h_{eye}$ and the depression angle θ, and values of the vehicle that is designed as the roll rate $K_{roll}$ and the distance $h_{roll}$ between the roll axis and the sight-line height. By determining a curve that is parallel to or substantially parallel to this hyperbola, the shape of the visible edge 16 of the instrument panel 14 of the vehicle that is the object can be determined.

Note that the shape of the visible edge 16 of the instrument panel 14 can be designed so as to be optimal for a specific driver by determining the hyperbola of above formula (15) by respectively using values of the vehicle that is designed, as the viewpoint height $h_{eye}$, the depression angle θ, the distance $h_{roll}$ between the roll axis and the viewpoint height, and the roll rate $K_{roll}$, and values of the individual driver who drives the vehicle that is designed. The vehicle is manufactured such that the shape of the instrument panel 14 becomes a shape that is based on this design.

Note that the present exemplary embodiment describes an example in which the shape of the visible edge 16 of the instrument panel 14 is made to be a hyperbola. However, the shape of the visible edge of the vehicle hood past the windshield glass 12, the shape of the top edge of a ceramic line formed at the windshield glass 12, the shape of the top edge of the blade portion of the windshield wiper, the shape of the top edge of the arm portion of the windshield wiper, or the like may be made to be a hyperbola.

Conventional computation is carried out on the assumption that the viewpoint of the driver is fixed at the vehicle. However, in actuality, the body of the driver leans in accordance with the lateral acceleration that arises, or tilts in the direction of turning of the vehicle in order to withstand the lateral acceleration that arises, and as a result, the viewpoint of the driver also changes together with the lateral movement of the vehicle. This amount of movement is a range of several centimeters. However, at the time of minute slaloming when the rolling sensation is important, this is motion that cannot be ignored. For example, when slaloming that generates acceleration of 2.5 m/s² at 0.5 Hz is carried out, the lateral motion of the vehicle becomes an amount of movement of around ±25 cm. At this time, if the lateral position of the viewpoint moves around 2.5 cm, the amount of movement of the viewpoint is of a magnitude that is around 10% of the motion of the vehicle. When assuming that the body of the driver leans in the direction opposite the lateral acceleration that arises at the vehicle, the amount of movement of the viewpoint is added to the amount of lateral movement of the vehicle that is a second order integration amount of the acceleration. Thus, a coefficient α (>1) for reflecting the results of movement of the viewpoint may be introduced, and formula (4) may be changed to:

[Formula 12]

$$dy = \frac{x}{h_{eye}} \cdot \alpha \cdot dY \quad (19)$$

α·dY is the amount of movement of the viewpoint and the vehicle. At this time, the shape of the visible edge of the instrument panel that is the object becomes:

[Formula 13]

$$y^2 = Ax^2 + 2Bx + C \quad (20)$$

$$A = \frac{\alpha \cdot h_{roll}}{h_{eye}} + \frac{\alpha}{(2\pi f)^2 K_{roll} h_{eye}} - 1 \quad (21)$$

$$B = -\frac{1}{2\pi f K_{roll} u} \quad (22)$$

$$C = \frac{B^2 - (B + A\theta)^2}{A} \quad (23)$$

Second Exemplary Embodiment

The first exemplary embodiment describes a case in which the shape of a vehicle structural part that blocks the lower end within the forward field of vision of the driver is designed as the shape of the visible edge 16 that corresponds to a target designed vehicle speed of the vehicle. A second exemplary embodiment describes a case of providing a vehicle control device at the vehicle, and controlling the shape of the visible edge to a shape that corresponds to the vehicle speed. Note that, in the structure of the vehicle of the second exemplary embodiment, structures that are the same as structures of the vehicle 10 of the above-described first exemplary embodiment are denoted by the same reference numerals, and description thereof is omitted.

Figure 9:
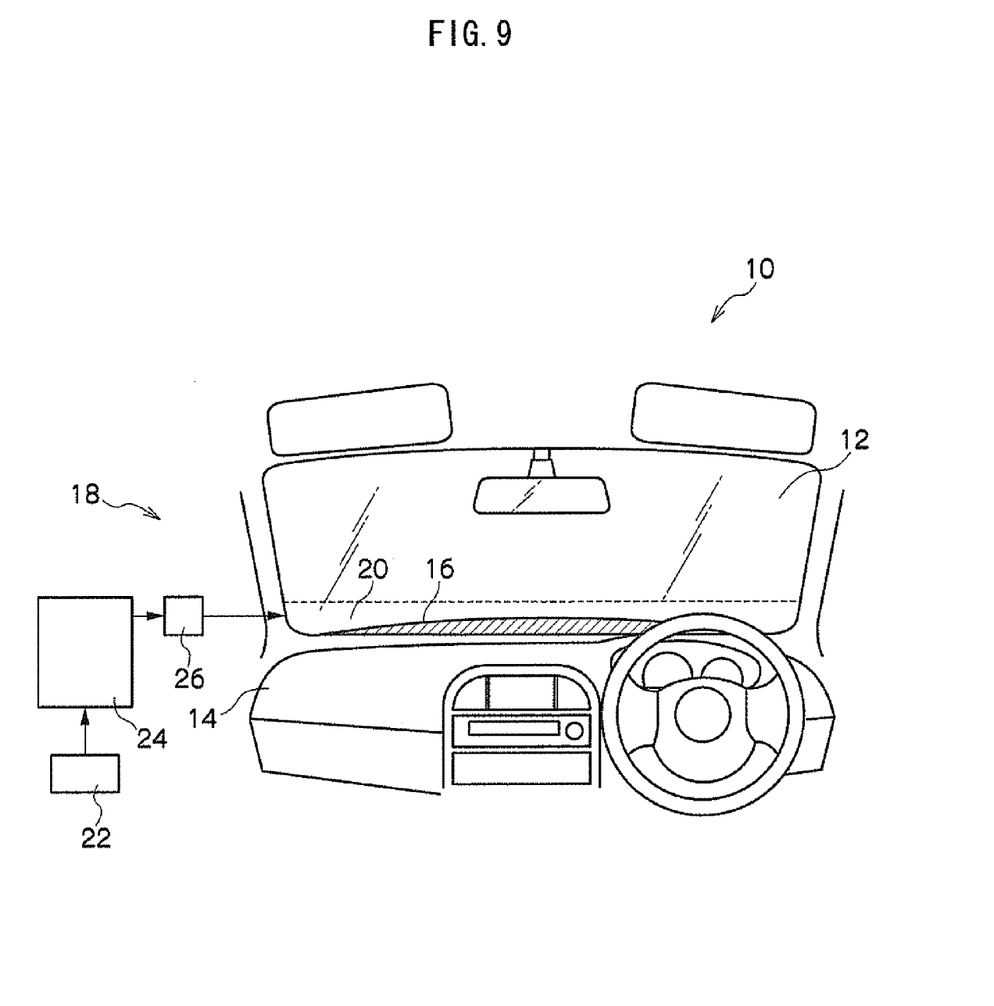
FIG. 9 is a schematic drawing of a vehicle equipped with a vehicle control device of a second exemplary embodiment.

FIG. 9 is a schematic drawing of a vehicle equipped with a vehicle control device 18 of the second exemplary embodiment.

The vehicle control device 18 has a long and thin liquid crystal panel 20 for displaying the visible edge 16, a vehicle speed sensor 22 that detects the vehicle speed of the vehicle 10, a computing section 24 that computes the shape of the visible edge 16 on the basis of the detected vehicle speed, and a driving section 26 that drives the liquid crystal panel 20 such that the visible edge 16 is displayed on the liquid crystal panel 20 on the basis of the computed shape of the visible edge 16. The long and thin liquid crystal panel 20 is provided at the lower end portion of the windshield glass 12, from one vehicle transverse direction end to the other end of the windshield glass 12.

The liquid crystal panel 20 is structured from pixels that are arrayed in the form of a matrix, and is controlled by driving of the driving section 26 such that each of the pixels is set in one of a transmitting state or a blocking state. When a blocking portion is formed at the lower end portion of the windshield glass 12, the upper end portion of the blocking portion becomes the visible edge 16.

The computing section 24 is structured by a microcomputer that is structured so as to include a CPU, a ROM and a RAM. The program of a processing routine, that will be described later and that includes the data of formulas (15) through (18) of the first exemplary embodiment, is stored in the ROM that serves as a storage medium. The computing section 24 computes the hyperbola that is the object by substituting as the vehicle speed u the vehicle speed that is outputted from the vehicle speed sensor 22, into the formula expressing the hyperbola of formula (15) that is obtained by substituting into formulas (16) through (18) a frequency of an ordinarily used range of minute steering (usually 0.5 Hz) as the steering frequency f, standard values as the sight-line height $h_{eye}$ and the depression angle θ, and values of the vehicle that is designed as the roll rate $K_{roll}$ and the distance $h_{roll}$ between the roll axis and the sight-line height.

The driving section 26 drives the liquid crystal panel 20 with the hyperbola determined by the computing section 24 as a border line, such that the pixels above the hyperbola are set in transmitting states and the pixels beneath the hyperbola are set in blocking states.

Figure 10:
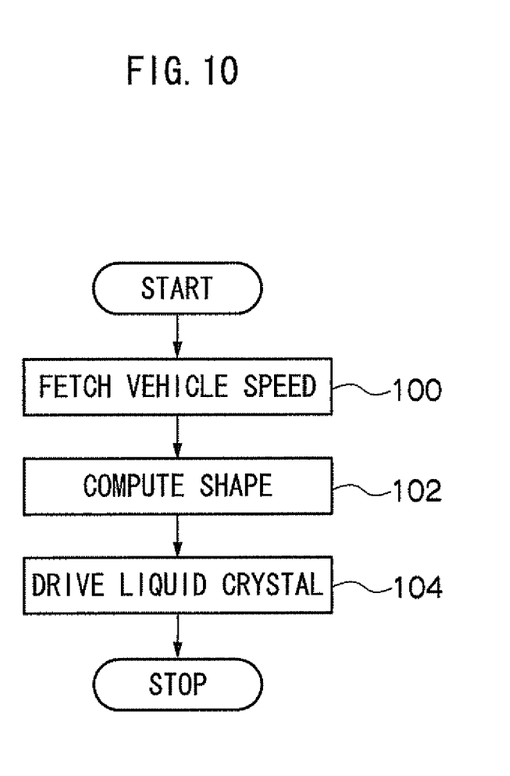
FIG. 10 is a flowchart showing a visible edge control processing routine in the second exemplary embodiment.

Next, a visible edge control processing routine will be described with reference to FIG. 10.

In step 100, the vehicle speed of the vehicle 10 is fetched by the vehicle speed sensor 22. Next, in step 102, the formula of the hyperbola that is to become the shape of the visible edge 16 is computed by substituting the fetched vehicle speed into the formulas stored in the computing section 24. Next, in step 104, the liquid crystal panel 20 that is provided at the lower end portion of the windshield glass 12 is driven on the basis of the computed hyperbola such that the visible edge 16 is displayed at the liquid crystal panel 20.

Figure 11:
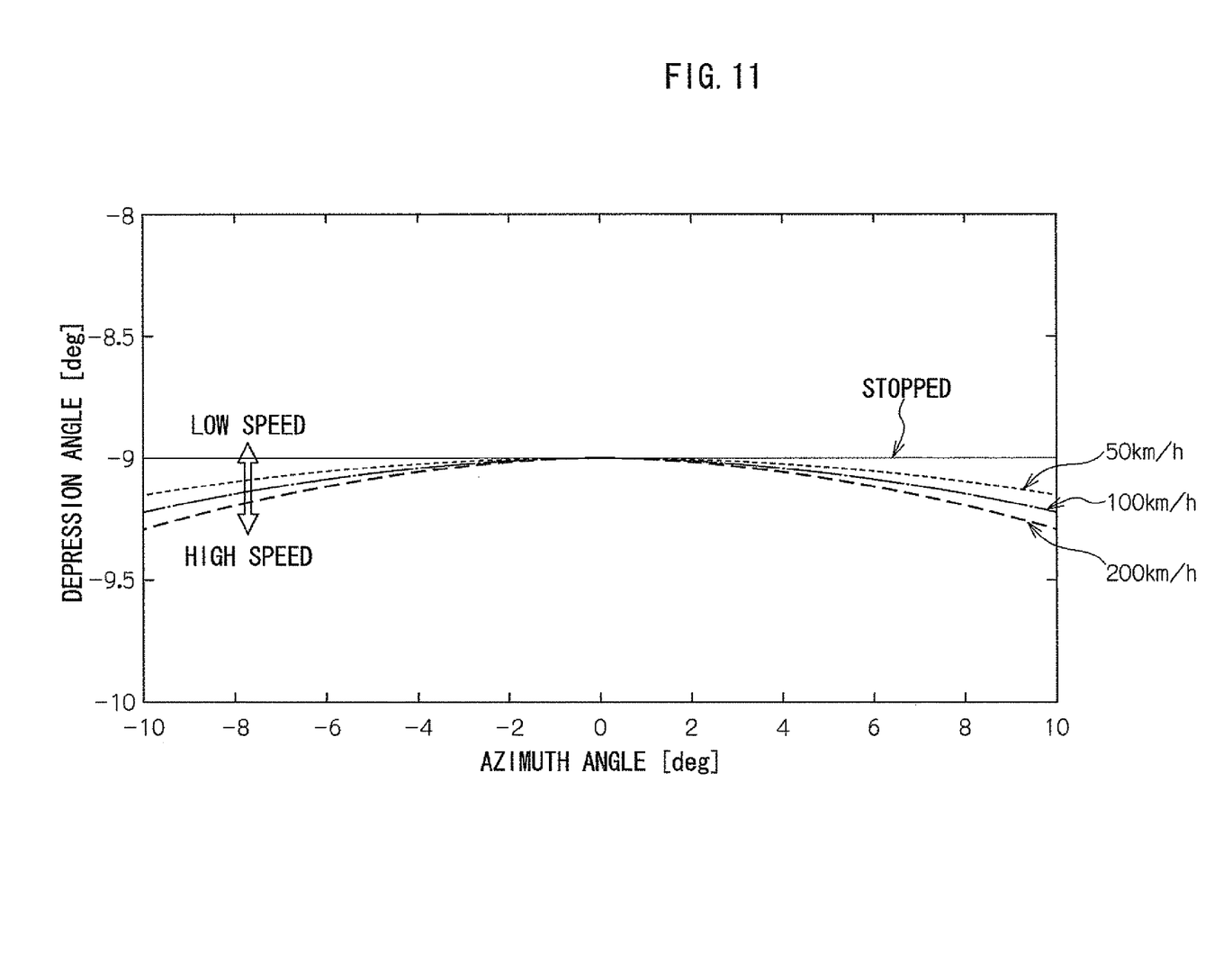
FIG. 11 is a graph showing speed characteristics of shapes of a visible edge.

The speed characteristics of shapes of the visible edge 16 are shown in FIG. 11. The shapes of the visible edge 16 in cases in which the vehicle speed is 50 km/h, 100 km/h, 200 km/h, and the vehicle is stopped are shown. In this way, the shape of the visible edge 16 is modified such that the proportion that is upwardly-convex increases as the vehicle speed increases, and the suitable visible edge 16 that corresponds to the vehicle speed can be displayed. Therefore, the rolling sensation can be ameliorated in accordance with the vehicle speed.

DESCRIPTION OF THE REFERENCE NUMERALS 10 vehicle
12 windshield glass
14 instrument panel
16 visible edge

What is claimed is:

1. A vehicle wherein at a time when the vehicle travels at a predetermined vehicle speed while minute steering is carried out:
   relative movement of the road is expressed as flow lines, and
   a shape of a boundary line between a forward view in a forward field of vision of a driver and a vehicle structural part that blocks a lower end of the forward view are formed so as to be parallel or substantially parallel to a curve that has been generated by a processor based on a mathematical representation of a velocity of the forward view in the forward field of vision of the driver by making the flow lines continuous, and the curve is expressed by the following function:

$$y2 = Ax2 + 2Bx + C$$

where x is a depression angle, y is an azimuth angle, A is a constant expressed by a sum of a ratio of a distance between a viewpoint height and a roll axis with respect to the viewpoint height and a reciprocal of a product of a roll rate and the viewpoint height, B is a constant expressed by a reciprocal of the roll rate, and C is a constant expressed by the constant A, the constant B and a depression angle of a sight-line direction of a driver.

2. The vehicle of claim 1, wherein an origin of the curve is positioned at a vehicle transverse direction center of the boundary line, or at a portion of the boundary line that is in front of a driver's seat.

3. The vehicle of claim 1, wherein the shape of the boundary line is a shape of a visible edge of a vehicle hood, a shape of a visible edge of a vehicle instrument panel, a shape of a top edge of a ceramic line formed at a windshield glass, a shape of a top edge of a blade portion of a windshield wiper, or a shape of a top edge of an arm portion of the windshield wiper.

4. The vehicle of claim 1, wherein the constant B is expressed so as to include a vehicle speed that is determined in advance, and decreases as vehicle speed increases.

5. A vehicle control device comprising:
a blocking member displayed so as to block a lower end portion of a view within a forward field of vision of a driver along a lower end portion of a windshield glass, a shape of a top edge of the blocking member being changeable;
a vehicle speed detecting section detecting vehicle speed; and
a shape modification section modifying the shape of the top edge of the blocking member such that relative movement of the road is expressed as flow lines and the shape of the top edge of the blocking member becomes parallel or substantially parallel to a curve that is generated by a processor by making the flow lines continuous at a time when the vehicle travels at a vehicle speed detected by the vehicle speed detecting section, while minute steering is carried out, and the curve is expressed by the following function:

$$y2 = Ax2 + 2Bx + C$$

where x is a depression angle, y is an azimuth angle, A is a constant expressed by a sum of a ratio of a distance between a viewpoint height and a roll axis with respect to the viewpoint height and a reciprocal of a product of a roll rate and the viewpoint height, B is a constant expressed by a reciprocal of the roll rate, and C is a constant expressed by the constant A, the constant B and a depression angle of a sight-line direction of a driver.

6. A method of manufacturing a vehicle, comprising:
at a time when the vehicle travels at a predetermined vehicle speed while minute steering is carried out, expressing relative movement of the road as flow lines; and generating a curve by making the flow lines continuous based on a mathematical representation of a velocity of the forward view in the forward field of vision of the driver; and
manufacturing a vehicle such that a shape of a boundary line between a forward view in a forward field of vision of a driver and a vehicle structural part that blocks a lower end of the forward view, is parallel or substantially parallel to the curve, the curve being expressed by the following function:

$$y2 = Ax2 + 2Bx + C$$

where x is a depression angle, y is an azimuth angle, A is a constant expressed by a sum of a ratio of a distance between a viewpoint height and a roll axis with respect to the viewpoint height and a reciprocal of a product of a roll rate and the viewpoint height, B is a constant expressed by a reciprocal of the roll rate, and C is a constant expressed by the constant A, the constant B and a depression angle of a sight-line direction of a driver.

7. The method of manufacturing a vehicle of claim 6, wherein an origin of the curve is positioned at a vehicle transverse direction center of the boundary line, or at a portion of the boundary line that is in front of a driver's seat.

* * * * *